United States Patent
Cook

(10) Patent No.: US 7,055,640 B2
(45) Date of Patent: Jun. 6, 2006

(54) FUEL CUT-OFF CONTROL SYSTEM FOR A VEHICLE

(75) Inventor: Stephen Cook, Essex (GB)

(73) Assignee: Ford Global Technologies, LLC, South Dearborn, MI (US)

( * ) Notice: Subject to any disclaimer, the term of this patent is extended or adjusted under 35 U.S.C. 154(b) by 217 days.

(21) Appl. No.: 10/605,137

(22) Filed: Sep. 10, 2003

(65) Prior Publication Data

US 2005/0051376 A1     Mar. 10, 2005

(51) Int. Cl.
*B60K 28/10*     (2006.01)

(52) U.S. Cl. .................... 180/284; 180/274; 180/279; 280/735

(58) Field of Classification Search ............... 180/274, 180/279, 284; 280/735; 123/198 D, 198 DB
See application file for complete search history.

(56) References Cited

U.S. PATENT DOCUMENTS

| | | | | |
|---|---|---|---|---|
| 3,550,717 | A | * | 12/1970 | Doty ........................ 180/284 |
| 3,743,849 | A | * | 7/1973 | Iwata ........................ 307/10.1 |
| 3,942,504 | A | * | 3/1976 | Ellsworth ............ 123/198 DB |
| 4,972,182 | A | | 11/1990 | Novik et al. |
| 4,990,906 | A | | 2/1991 | Kell et al. |
| 5,347,267 | A | | 9/1994 | Murray |
| 5,508,694 | A | | 4/1996 | Treharne et al. |
| 5,531,290 | A | * | 7/1996 | Furuichi et al. ............ 180/271 |
| 5,610,574 | A | | 3/1997 | Mutoh et al. |
| 5,659,291 | A | | 8/1997 | Kennedy et al. |
| 5,684,701 | A | * | 11/1997 | Breed ........................ 701/45 |
| 5,793,121 | A | * | 8/1998 | Burgess ..................... 307/10.1 |
| 5,797,111 | A | | 8/1998 | Halasz et al. |
| 6,000,609 | A | | 12/1999 | Gokcebay et al. |
| RE36,505 | E | * | 1/2000 | Treharne et al. ........... 340/5.23 |
| 6,092,500 | A | * | 7/2000 | Frank et al. ............ 123/198 D |
| 6,170,332 | B1 | * | 1/2001 | MacDonald et al. ..... 73/514.38 |
| 6,222,460 | B1 | * | 4/2001 | DeLine et al. ............ 340/815.4 |
| 6,223,714 | B1 | | 5/2001 | Anderson et al. |
| 6,285,948 | B1 | | 9/2001 | Takagi et al. |
| 6,536,401 | B1 | * | 3/2003 | McConnell .............. 123/198 D |
| 6,538,558 | B1 | | 3/2003 | Sakazume et al. |
| 6,640,174 | B1 | * | 10/2003 | Schondorf et al. ........... 701/45 |
| 6,691,572 | B1 | * | 2/2004 | Handrich ................. 73/514.18 |
| 6,766,235 | B1 | * | 7/2004 | Frimberger et al. ........... 701/45 |
| 6,831,572 | B1 | * | 12/2004 | Strumolo et al. ........... 340/903 |
| 2001/0015692 | A1 | | 8/2001 | Takanori et al. |

* cited by examiner

*Primary Examiner*—Paul N. Dickson
*Assistant Examiner*—Laura B. Rosenberg
(74) *Attorney, Agent, or Firm*—Frank A. MacKenzie

(57) ABSTRACT

A fuel cut-off control system (12) for a vehicle (10) is provided. This system (12) includes one or more crash sensors (24) for detecting a fuel cut-off event and for generating a crash signal. These sensors (24) are coupled to a controller (26) and are utilized for transmitting the crash signal thereto. This controller (26) is coupled to a fuel supply system (14) and is intended to temporarily disable the fuel supply system (14) when the controller (26) receives the crash signal. The controller (26) is also coupled to an indicator mechanism (28) and is intended to transmit a cut-off notification signal to the indicator mechanism (28). This indicator mechanism (28) can then display a cut-off notification message to an occupant of the vehicle (10). Finally, the controller (26) also has a reset mechanism (30) coupled thereto. This reset mechanism (30) is intended to be manually operated by the occupant for the purpose of returning the fuel supply system (14) to an operational condition.

16 Claims, 1 Drawing Sheet

FUEL CUT-OFF CONTROL SYSTEM FOR A VEHICLE

BACKGROUND OF INVENTION

The present invention relates generally to fuel cut-off control systems for vehicles, and more particularly to a fuel cut-off control system that utilizes a series of crash sensors for detecting a fuel cut-off event, providing notice of the fuel cut-off event, and requiring manual reset of the system.

Fuel cut-off control devices and systems for internal combustion engines of vehicles are well known. These devices and systems typically are utilized for stopping the delivery of fuel to the engine in the event of a crash or various other fuel cut-off events.

Certain vehicles include a fuel pump with an inertia-actuated switch for cutting off power to the fuel pump when the switch is subjected to a substantial lateral pulse, e.g. a vehicle impact. This inertia-actuated switch can require that the driver manually operate the switch to reactivate the pump and allow the pump to continue delivering fuel to the engine. A drawback of these fuel pumps is that the inertia-actuated switch may not detect a vehicle impact event as efficiently as a series of electronic crash sensors. As a result, the fuel cut-off control system may fail to shut down the fuel pump under emergency conditions that require such action.

Other more recently developed fuel cut-off control systems do not include these inertia-actuated switch devices, but instead have a switch device, which is triggered by a series of more sensitive electronic crash sensors. These electronic crash sensors are beneficial because they can precisely detect the magnitude of a pulse from a substantial number of directions. Typically, these fuel cut-off control systems also include additional electronic circuitry for automatically resetting the fuel cut-off control systems. In this way, these systems do not require that the driver operate a switch conspicuously dedicated to returning the fuel supply system to an operational condition. For this reason, the delivery of fuel to the engine typically is continued without alerting the driver that the fuel supply has been cut off. By way of example, the fuel cut-off control system can include electronic circuitry for automatically resetting the system by merely requiring that the driver turn the ignition off and then on again.

A drawback of these automatically resetting systems is that they do not alert the driver of the potential damages resulting from the fuel cut-off event. In particular, as mentioned above, these automatically resetting systems typically do not notify the driver that the fuel supply has been cut off. In this regard, a typical driver could mistakenly believe that the vehicle is in a safe operating condition for the mere reason that he can restart the engine after the crash. However, the crash may have damaged the vehicle to the point that the vehicle requires repairs before it can be driven safely. For this reason, existing systems can provide the driver with a false sense of security and increase the risk of injury. For example, the crash can substantially damage a fuel line and allow fuel to leak from the vehicle. Such a result clearly presents a substantial fire hazard and a serious risk of injury.

Therefore, a need exists for a fuel cut-off control system that efficiently detects a fuel cut-off event, stops delivery of fuel to the engine, provides notice that the delivery of fuel has been cut-off, and requires manual reset.

SUMMARY OF INVENTION

The present invention provides a fuel cut-off control system for a vehicle. This system includes one or more crash sensors for detecting a fuel cut-off event and for generating a crash signal. These sensors are coupled to a controller and transmit the crash signal thereto. This controller is coupled to a fuel supply system and is intended to temporarily disable the fuel supply system when the controller receives the crash signal. The controller is also coupled to an indicator mechanism and is intended to transmit a cut-off notification signal to the indicator mechanism. This indicator mechanism can then display a cut-off notification message to an occupant of the vehicle. Finally, the controller also has a reset mechanism coupled thereto. This reset mechanism is intended to be manually operated by the occupant for the purpose of returning the fuel supply system to an operational condition.

One advantage of the present invention is that a fuel cut-off control system for a vehicle is provided that stops the delivery of fuel to the vehicle's engine after a vehicle impact, a roll-over, or various other fuel cut-off events that can create a serious fire hazard.

Another advantage of the present invention is that a fuel cut-off control system is provided that continues the delivery of fuel to the engine only after actuation by an individual.

Yet another advantage of the present invention is that a fuel cut-off control system is provided that notifies an occupant that the delivery of fuel has been cut off.

Still another advantage of the present invention is that a fuel cut-off control system is provided that encourages a driver to inspect the integrity of the fuel supply system before resuming operation of the vehicle.

Yet another advantage of the present invention is that a fuel cut-off control system is provided that can utilize various devices commonly integrated within a conventional vehicle thereby minimizing the overall vehicle weight and manufacturing costs.

Other advantages of the present invention will become apparent upon considering the following detailed description and appended claims, and upon reference to the accompanying drawings.

BRIEF DESCRIPTION OF DRAWINGS

For a more complete understanding of this invention, reference should now be made to the embodiments illustrated in greater detail in the accompanying drawings and described below by way of the examples of the invention:

FIG. 1 is a schematic view of a vehicle having a fuel cut-off control system, according to one embodiment of the present invention; and.

DETAILED DESCRIPTION

Figure 1:
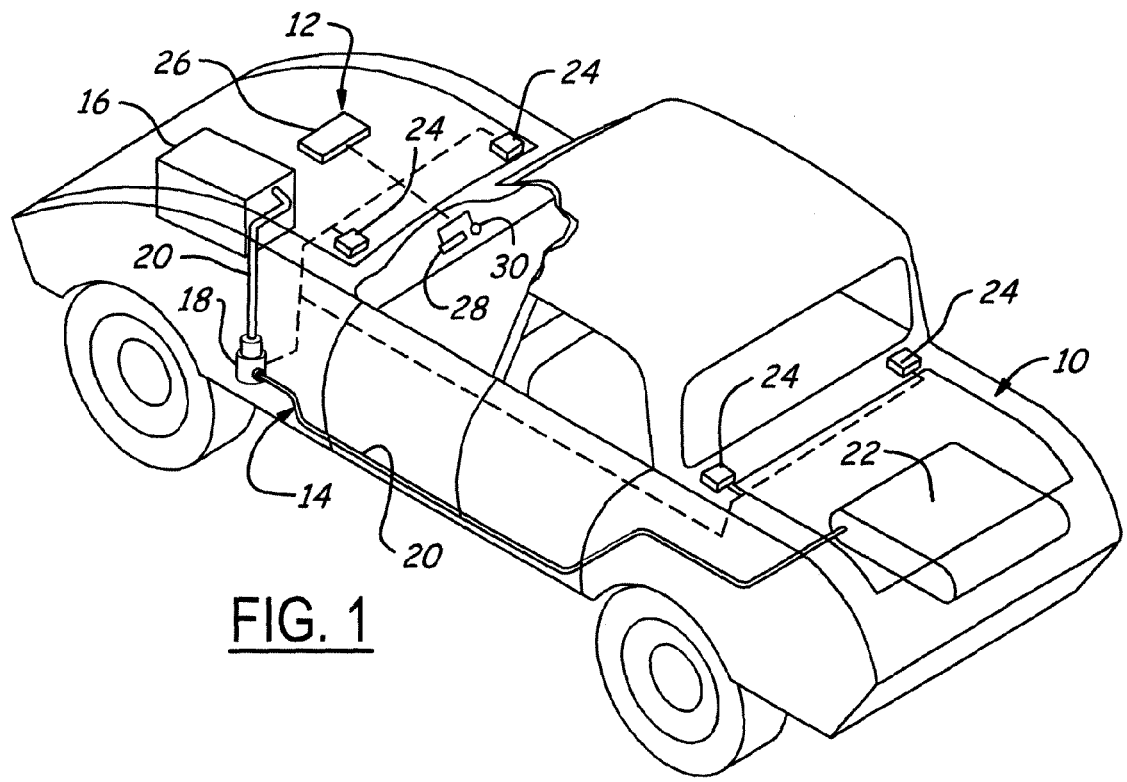

In the following figures, the same reference numerals are used to identify the same components in the various views.

The present invention is particularly suited for fuel cut-off control systems having one or more components that are commonly integrated within vehicles, for various other applications. In one embodiment, the fuel cut-off control system includes a series of crash sensors that are also utilized for the vehicle's supplemental restraint system (SRS). In this regard, the embodiments described herein employ features where the context permits. However, it is understood that a variety of other embodiments without the described features are contemplated as well. For example, the fuel cut-off control system can instead include crash sensors that are utilized only for the fuel cut-off control system and no other system, e.g. an SRS. Thus, it follows that the present invention can be carried out in various other modes as desired.

Referring to FIG. 1, there generally is shown a vehicle 10 having a fuel cut-off control system 12 integrated therein, according to one embodiment of the present invention. The fuel cut-off control system 12 includes a fuel supply system 14 for delivering fuel from a fuel tank 22 to an internal combustion engine 16 of the vehicle 10. Specifically, this fuel supply system 14 includes a fuel pump 18 and one or more fuel lines 20 in connection between the fuel tank 22 and the engine 16. As is known, the fuel pump 18 is utilized to pressurize the fuel lines 20 and deliver fuel to the engine 16 from the tank 22.

The fuel cut-off control system 12 further includes one or more crash sensors 24 for detecting a fuel cut-off event. An example of a fuel cut-off event is a vehicle impact of a threshold G-force level. This threshold G-force level can be equal to a lateral pulse associated with the vehicle 10 colliding into a brick wall at a minimum speed of 10 mph. However, it is contemplated that the crash sensors can instead be utilized for detecting various other kinds of fuel cut-off events. For example, the fuel cut-off event can be a vehicle impact measured by various other suitable G-force levels or other parameters as desired.

Each crash sensor 24 is comprised of electronic circuitry with a micromechanical accelerometer integrated therein. However, it will be appreciated that various other suitable sensor devices can be utilized as desired. The electronic circuitry of each crash sensor 24 generates a crash signal when the accelerometer detects a fuel cut-off event. As detailed later, this crash signal is transmitted to a controller 26 of the fuel cut-off control system 12.

In one embodiment, these crash sensors 24 are components of a conventional SRS (not shown) of the vehicle 10. In this way, the crash sensors 24 are utilized to trigger the SRS during a collision and deploy one or more of the vehicle's airbags. Additionally, these crash sensors 24 are also utilized for causing the fuel supply system 14 to stop delivery of fuel to the engine 16. In this respect, the crash sensors 24 accomplish a dual purpose. However, it will be appreciated that the crash sensors 24 may not be components of a SRS and therefore may be used only for the fuel cut-off control system 12.

The fuel cut-off control system 12 further includes a controller 26 that is coupled to the fuel supply system 14 and each crash sensor 24. This controller 26 is intended to receive the crash signal from one or more of the crash sensors 24. Thereafter, the controller 26 temporarily disables the fuel supply system 14.

Specifically, in one embodiment, the controller 26 disables the fuel supply system 14 by temporarily suspending the power supply to the fuel pump 18. This controller 26 is coupled to the fuel pump 18 and includes electronic circuitry for selectively supplying power to the fuel pump. This circuitry includes a switch that remains closed during normal operation of the vehicle and is opened when the controller 26 receives a crash signal from one of the crash sensors 24. However, it is also understood that the controller 26 can disable the fuel supply system 14 utilizing various other methods as desired.

The controller 26 is also coupled to an indicator mechanism 28 for providing notice that the delivery of fuel to the engine 16 has been temporarily suspended. Specifically, when the controller 26 receives the crash signal from the crash sensors 24, it generates a cut-off notification signal. This cut-off notification signal is then transmitted from the controller 26 to the indicator mechanism 28. As a result, the indicator mechanism 28 displays a cut-off notification message to an occupant of the vehicle 10.

In one embodiment, the indicator mechanism 28 is a digital LCD odometer that is integrated within a conventional instrument cluster (not shown). This odometer is utilized to display the mileage of the vehicle. Furthermore, the odometer is also utilized for scrolling a cut-off notification message to the driver. In this way, the odometer accomplishes two functions thereby minimizing the number of vehicle components, the overall weight of the vehicle, and the manufacturing costs. However, it will be appreciated that the indicator mechanism 28 can be various other devices that are already used in a typical vehicle. For example, the indicator mechanism 28 can instead be a digital clock display. Alternatively, the indicator mechanism 28 can be a low-fuel indicator, which flashes during a fuel cut-off event. Moreover, the indicator mechanism 28 can be a message display center integrated within the dashboard for displaying a variety of messages to the driver. However, it is also understood that the indicator mechanism can simply be a display device dedicated for the sole purpose of notifying an occupant of the fuel cut-off event.

The fuel cut-off control system 12 also includes a reset mechanism 30 for resuming delivery of fuel to the engine 16 after a fuel cut-off event. The reset mechanism 30 is operated by an individual. This feature is beneficial because it can require that the driver acknowledges the severity of the fuel cut-off event and also encourage him to inspect the fuel supply system for leaks or other damages.

In one embodiment, the reset mechanism 30 is a trip odometer button that is coupled to the controller 26. This trip odometer button is utilized for toggling the display of one or more trip meters and resetting those meters. In addition, the trip odometer button is also employed for returning the fuel supply system 14 to an operational condition. In particular, an individual may operate the trip odometer button according to a predetermined procedure for transmitting a delivery-continuation signal to the controller 26. For example, after a fuel cut-off event, an individual may reset the fuel supply system 14 by pressing and holding the trip odometer button for a predetermined amount of time, e.g. a minimum of ten seconds. In this way, the driver cannot easily restart the engine and operate the vehicle 10 after a fuel cut-off event without first taking certain steps, which are not typically performed for starting a vehicle. This feature is advantageous because it can alert the individual of the severity of the fuel cut-off event and encourage him to check the fuel supply system 14 for any damages before operating the vehicle 10.

It is also contemplated that the reset mechanism 30 can be various other suitable devices, e.g. a switch device conspicuously dedicated to resetting the fuel cut-off control system 12.

Figure 2:
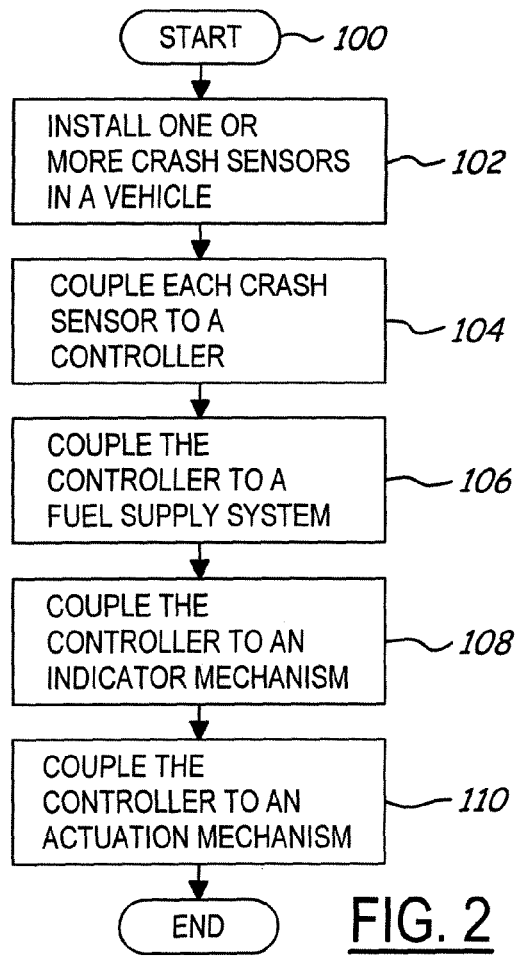
FIG. 2 is a flowchart showing a method for installing a fuel cut-off control system, according to one embodiment of the present invention.

Referring now to FIG. 2, there is shown a flowchart of a method for installing a fuel cut-off control system 12 into a vehicle 10, according to one embodiment of the invention. The sequence begins in step 100 and then immediately proceeds to step 102.

In step 102, one or more crash sensors 24 are installed within a vehicle 10. These crash sensors 24 are coupled to an SRS of the vehicle 10. In this regard, the sensors 24 are utilized for triggering deployment of one or more airbags, as well as for cutting off the delivery of fuel to the engine 16. However, it is understood that the sensors 24 can be utilized for the sole purpose of cutting off the delivery of fuel to the engine 16 as desired. As described above, each sensor 24 includes electronic circuitry with a micromechanical accelerometer. However, it is understood that a variety of other suitable sensor devices can be utilized. The sequence then proceeds to step 104.

In step 104, each crash sensor 24 is electronically coupled to a controller 26. In this way, the crash sensors 24 can transmit a crash signal to the controller 26 during a fuel cut-off event. The sequence then proceeds to step 106.

In step 106, the controller 26 is electronically coupled to a fuel supply system 14. Specifically, in one embodiment, the controller 26 includes electronic circuitry that is coupled to a fuel pump 18 for selectively providing that fuel pump 18 with electrical power. As described above, this electronic circuitry includes a switch that is closed during normal operation of the vehicle 10 and is open when the controller 26 receives a crash signal from one or more of the crash sensors 24. However, it will be appreciated that the controller 26 can instead be coupled to other components of the fuel supply system 14 and selectively disable or lock those components. Then, the sequence proceeds to step 108.

In step 108, the controller is electronically coupled to an indicator mechanism 28. In one embodiment, the indicator mechanism 28 is a digital LCD odometer integrated within an instrument cluster of the vehicle's dashboard. This odometer can scroll a cut-off notification message for the driver to read. It is also contemplated that the controller 26 can instead be electronically coupled to a variety of other suitable display mechanisms typically integrated within the vehicle, e.g. a digital clock display, a low-fuel indicator, and a message display center. Moreover, it will be appreciated that the controller can instead be electronically coupled to an indicator mechanism that is not typically integrated within the vehicle or utilized for any other purpose than to inform the driver of a fuel cut-off event. The sequence then proceeds to step 110.

In step 110, the controller 26 is electronically coupled to a reset mechanism 30. As described above, this reset mechanism 30 is utilized for resetting the fuel cut-off control system 12 and returning the fuel supply system 14 to an operational condition. In one embodiment, this reset mechanism 30 is a trip odometer button integrated within an instrument cluster of a vehicle's dashboard. In operation, this odometer button can be utilized for returning the fuel supply system to an operational condition if the button is pressed and held for a predetermined amount of time, e.g. ten seconds. However, it will be appreciated that various other reset mechanisms, e.g. a clock adjustment button, that are typically integrated within vehicles for other applications can be utilized as desired. Moreover, it is also understood that the reset mechanism can instead be a device that is utilized for the sole purpose of resetting the fuel cut-off control system 12.

While particular embodiments of the invention have been shown and described, it will be understood, of course, that the invention is not limited thereto since modifications may be made by those skilled in the art, particularly in light of the foregoing teachings. Accordingly, it is intended that the invention be limited only in terms of the appended claims.

The invention claimed is:

1. A fuel cut-off control system for a vehicle, comprising:
a fuel supply system delivering fuel to an engine;
at least one crash sensor detecting a fuel cut-off event and generating a crash signal during said fuel cut-off event;
a controller receiving said crash signal from said at least one crash sensor, disabling said fuel supply system, and generating a cut-off notification signal;
an indicator mechanism receiving said cut-off notification signal from said controller;
said indicator mechanism displaying a cut-off notification message to an occupant of said vehicle; and
a reset mechanism operated by said occupant for transmitting a delivery-continuation signal to said controller and resuming fuel supply to said engine;
said reset mechanism comprised of at least one of a clock button and a trip odometer button.

2. The fuel cut-off control system as recited in claim 1 wherein said at least one crash sensor is an integral part of a supplemental restraint system having at least one airbag.

3. The fuel cut-off control system as recited in claim 1 wherein said indicator mechanism is a message display center.

4. The fuel cut-off control system as recited in claim 1 wherein said indicator mechanism is a digital clock display integrated within a dashboard of the vehicle.

5. The fuel cut-off control system as recited in claim 1 wherein said fuel supply system includes a fuel pump coupled to said controller.

6. A fuel cut-off control system for a vehicle, comprising:
at least one crash sensor for detecting a fuel cut-off event and generating a crash signal during said fuel cut-off event;
a fuel supply system coupled to an engine and intended to deliver fuel to said engine;
a controller coupled to said at least one crash sensor and said fuel supply system, said controller for receiving said crash signal from said at least one crash sensor, disabling said fuel supply system, and generating a cut-off notification signal;
an odometer display mechanism coupled to said controller for receiving said cut-off notification signal from said controller and displaying a cut-off notification message to an occupant of the vehicle; and
a reset mechanism coupled to said controller, said reset mechanism operated by said occupant and intended to transmit a delivery-continuation signal to said controller for resuming delivery of fuel to said engine;
said reset mechanism comprising a trip odometer button.

7. The fuel cut-off control system as recited in claim 6 wherein said at least one crash sensor is an integral part of a supplemental restraint system having at least one airbag.

8. The fuel cut-off control system as recited in claim 6 wherein said at least one crash sensor includes an electronic circuitry having a micromechanical accelerometer integrated therein.

9. The fuel cut-off control system as recited in claim 1 wherein said fuel supply system includes a fuel pump coupled to said controller.

10. A method for installing a fuel cut-off control system in a vehicle, comprising:
installing at least one crash sensor in the vehicle;
electronically coupling said at least one crash sensor to a controller;
electronically coupling said controller to a fuel supply system;
electronically coupling said controller to an indicator mechanism; and
electronically counling said controller to a reset mechanism;

said reset mechanism comprised of at least one of a trip odometer button and a clock button.

11. The method as recited in claim 10 wherein installing said at least one crash sensor in the vehicle comprises installing at least one airbag crash sensor in the vehicle, said airbag crash sensor being electronically coupled to a supplemental restraint system of the vehicle.

12. The method as recited in claim 10 wherein electronically coupling said controller to said at least one crash sensor comprises electronically coupling said controller to an electronic circuitry having a micromechanical accelerometer integrated therein.

13. The method as recited in claim 10 wherein electronically coupling said controller to said fuel supply system comprises electronically coupling said controller to a fuel pump.

14. The method as recited in claim 10 wherein electronically coupling said controller to said indicator mechanism comprises electronically coupling said controller to an odometer display mechanism.

15. The method as recited in claim 10 wherein electronically coupling said controller to said indicator mechanism comprises electronically coupling said controller to a digital clock display.

16. The method as recited in claim 10 wherein electronically coupling said controller to said indicator mechanism comprises electronically coupling said controller to a low-fuel indicator.

\* \* \* \* \*